(12) United States Patent
Pourmohammad et al.

(10) Patent No.: US 12,093,844 B2
(45) Date of Patent: *Sep. 17, 2024

(54) ANALYSIS SYSTEM WITH MACHINE LEARNING BASED INTERPRETATION

(71) Applicant: Tyco Fire & Security GmbH, Neuhausen am Rheinfall (CH)

(72) Inventors: Sajjad Pourmohammad, Milwaukee, WI (US); Kelsey Carle Schuster, Wauwatosa, WI (US); Christopher J. Verink, Glendale, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/119,538

(22) Filed: Mar. 9, 2023

(65) Prior Publication Data

US 2023/0206091 A1 Jun. 29, 2023

Related U.S. Application Data

(63) Continuation of application No. 16/427,806, filed on May 31, 2019, now Pat. No. 11,605,011.

(51) Int. Cl.
*G06N 5/04* (2023.01)
*F24F 11/30* (2018.01)
*G06N 20/00* (2019.01)

(52) U.S. Cl.
CPC .............. *G06N 5/04* (2013.01); *F24F 11/30* (2018.01); *G06N 20/00* (2019.01)

(58) Field of Classification Search
CPC ...... F24F 11/30; F24F 2120/20; G06N 20/00; G06N 5/04

See application file for complete search history.

(56) References Cited

U.S. PATENT DOCUMENTS

2011/0173496 A1* 7/2011 Hosek ...................... G07C 3/00
714/26
2014/0074730 A1* 3/2014 Arensmeier ............. F24F 11/38
705/305

(Continued)

OTHER PUBLICATIONS

Syafrudin et al., Performance Analysis of IoT-Based Sensor, big Data Processing, and Machine Learning Model for Real-Time Monitoring System in Automotive Manufacturing, Sep. 2018, Department of Industrial and Systems Engineering, Dongguk University, Seoul 100-715, Korea;, pp. 1-24. (Year: 2018).*

(Continued)

*Primary Examiner* — Kidest Bahta
(74) *Attorney, Agent, or Firm* — Foley & Lardner LLP

(57) ABSTRACT

A system for predicting performance of building equipment includes one or more processors and memory storing instructions. When executed by the one or more processors, the instructions cause the one or more processors to perform operations. The operations include obtaining sensor data generated by one or more sensors while operating the building equipment to affect one or more environmental conditions of a building, generating a predicted performance of the building equipment using a machine learning model if the machine learning model comprises prior data similar to the sensor data, and requesting feedback from an expert related to the predicted performance of the building equipment if the sensor data are different from the prior data.

17 Claims, 8 Drawing Sheets

(56) References Cited

U.S. PATENT DOCUMENTS

| | | |
|---|---|---|
| 2014/0266755 A1 | 9/2014 | Arensmeier et al. |
| 2017/0124484 A1* | 5/2017 | Thompson ............ G06F 3/0484 |
| 2017/0178311 A1 | 6/2017 | Pal |
| 2018/0046149 A1 | 2/2018 | Ahmed |
| 2019/0033171 A1* | 1/2019 | Zhang .................... F02D 41/22 |
| 2019/0187635 A1 | 6/2019 | Fan et al. |
| 2020/0340698 A1 | 10/2020 | Ben-Gal Nguyen et al. |
| 2021/0071889 A1* | 3/2021 | Picardi .................... F24F 11/63 |

OTHER PUBLICATIONS

Holleman, M., "Machine learning on mobile: on the device or in the cloud?" URL: https://machinethink.net/blog/machine-learning-device-or-cloud/, Feb. 16, 2017 (18 pages).

Ramani, A., "Diagnosis and Prognosis of Electrical and Mechanical Faults Using Wireless Sensor Networks and Two-Stage Neural Network Classifier," University of Texas at Arlington, Aug. 2008, (125 pages).

* cited by examiner

ANALYSIS SYSTEM WITH MACHINE LEARNING BASED INTERPRETATION

CROSS-REFERENCE TO RELATED PATENT APPLICATION

This application is a continuation of U.S. patent application Ser. No. 16/427,806 filed May 31, 2019, the entire disclosure of which is incorporated by reference herein.

BACKGROUND

The present disclosure relates generally to heating, ventilation, and air conditioning (HVAC) systems. The present disclosure relates more particularly to an analysis system for HVAC systems.

A building can include building equipment such as an HVAC system, and a data analysis system configured to analyze data from the HVAC system to determine whether it is operating normally, in need of preventive maintenance, or is in danger of malfunctioning. Traditional data analysis systems have a specific set of criteria upon which the data are analyzed, and the criteria may only be modified manually. However, there are instances in which data that normally would indicate an issue with the HVAC system is not actually a concern. Additionally, there are instances in which the HVAC system is in need of maintenance but the set data analysis criteria do not provide notification of the maintenance need. Furthermore, some data analysis systems incorporate machine learning algorithms in attempts to predict system performance, however those data analysis systems still require periodic site visits by a technician even if no maintenance is needed.

SUMMARY

One embodiment of the present disclosure is a system for predicting performance of building equipment. The system comprises one or more sensors in communication with the building equipment, and the sensors are operable to detect characteristics from the building equipment. The system further comprises a computing device in communication with the sensors and in the same geographic location as the sensors. The computing device comprises one or more memory devices configured to store instructions that, when executed on one or more processors, cause the one or more processors to receive data from the sensors, the data based on the detected characteristics. The one or more processors also generate, based on a machine learning model and the data, a predicted performance of the building equipment when the machine learning model comprises a prior data substantially similar to the data. The one or more processors also request feedback from an expert if the data is substantially different from the prior data, the feedback related to the performance of the building equipment based on the data.

Another embodiment of the present disclosure is a method for predicting performance of building equipment. The method comprises receiving, by a processing circuit of a computing device, a first data from sensors coupled to the building equipment, the first data indicating the performance of the building equipment. The method further comprises generating, by the processing circuit, a predicted performance of the building equipment when a machine learning model comprises a prior data substantially similar to the first data. The method additionally comprises requesting, by the processing circuit, feedback from an expert if the first data is substantially different from the prior data, the feedback related to the performance of the building equipment based on the first data.

Another embodiment of the present disclosure is a building system of a building, the building system comprising building equipment configured to control one or more environmental conditions of the building. The building equipment comprises one or more sensors configured to collect data while the building equipment operates to control the one or more environmental conditions The building equipment further comprises a computing device comprising a processing circuit. The processing circuit is configured to receive the data from the sensors, the data based on characteristics detected by the sensors, and generate, based on a machine learning model and the data, a predicted performance of the building equipment when the machine learning model comprises a prior data substantially similar to the data. The processing circuit is further configured to request feedback from an expert if the data is substantially different from the prior data, the feedback related to the predicted performance of the building equipment based on the data.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, systems and methods are shown for predicting when a machine (e.g., a chiller, a boiler, an air handler unit, or any other building device) will shut down or need preventive maintenance based on analysis of machine performance, according to various exemplary embodiments. As used herein, the term performance refers to the ability of a machine to function as intended. For example, the performance of a chiller is based on the ability of the chiller to remove heat from a system. The machine performance can be analyzed by measuring vibrations, temperature, flow rates, and any other characteristic that is indicative of the performance of a machine. The systems and methods discussed herein include sensors that can collect data from building equipment and a machine learning model that can analyze the collected data to determine whether the building equipment will shut down in the future due to a malfunction, or if the building equipment requires preventive maintenance to prevent such a shut down. As discussed herein, the determination of the maintenance status of building equipment, and the reasoning for such a determination, can be communicated to a cloud service and to a user. The cloud service can determine if updated or new models are available that can more accurately determine the status of the building equipment. The user can also determine if the machine learning model accurately determined the status of the building equipment and provide feedback. The machine learning model can be replaced or upgraded automatically by the cloud service, or on demand by the user.

Using this system and method, complications associated with building equipment maintenance can be minimized as the system becomes more efficient over time. The tangible result of incorporating this system and method is less time required by humans to diagnose problems with building equipment, faster decisions regarding building equipment maintenance, and less building equipment downtime overall.

Building Management Systems and HVAC Systems

Figure 1:
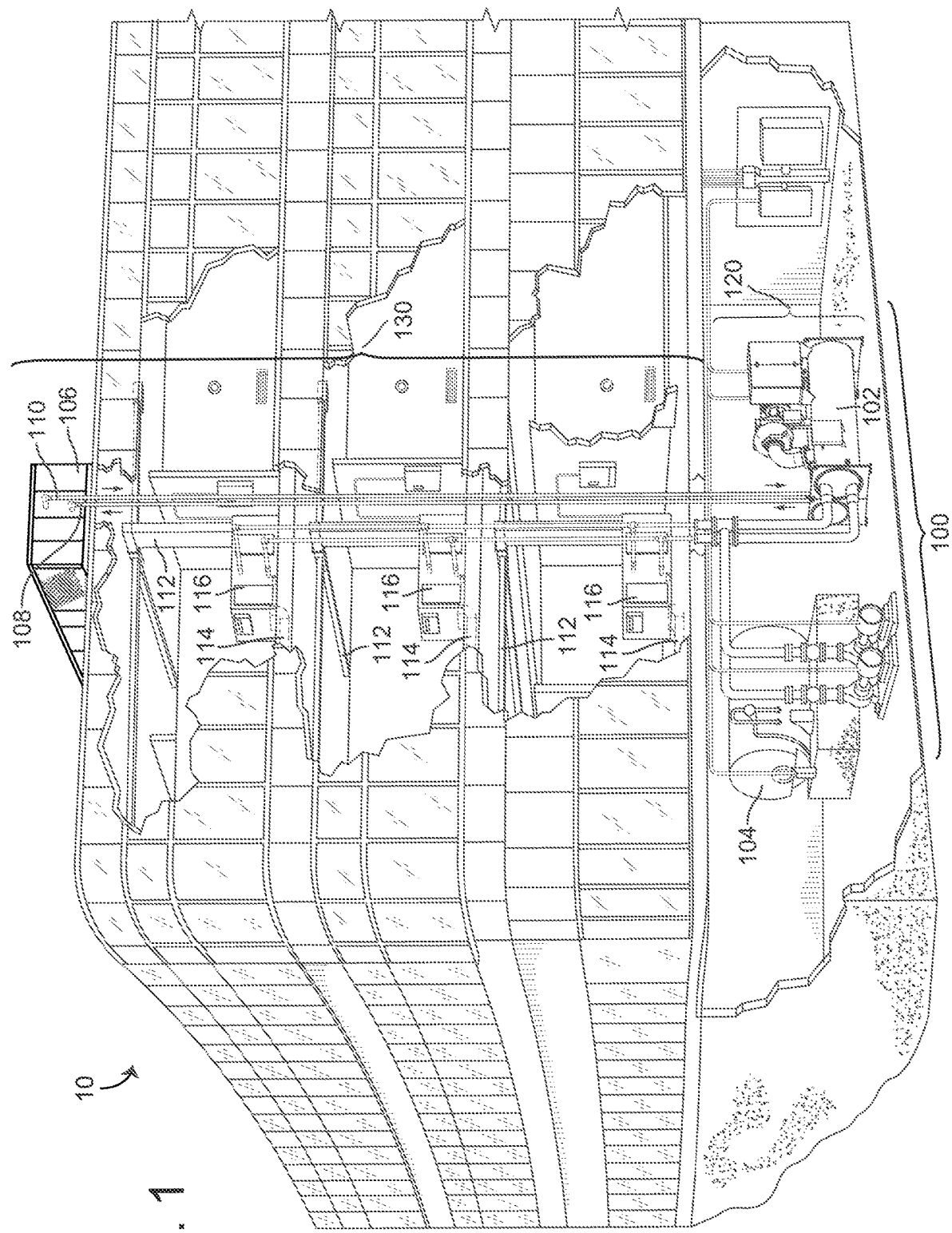
FIG. 1 is a drawing of a building equipped with a building management system (BMS) and a HVAC system, according to an exemplary embodiment.
Figure 2:
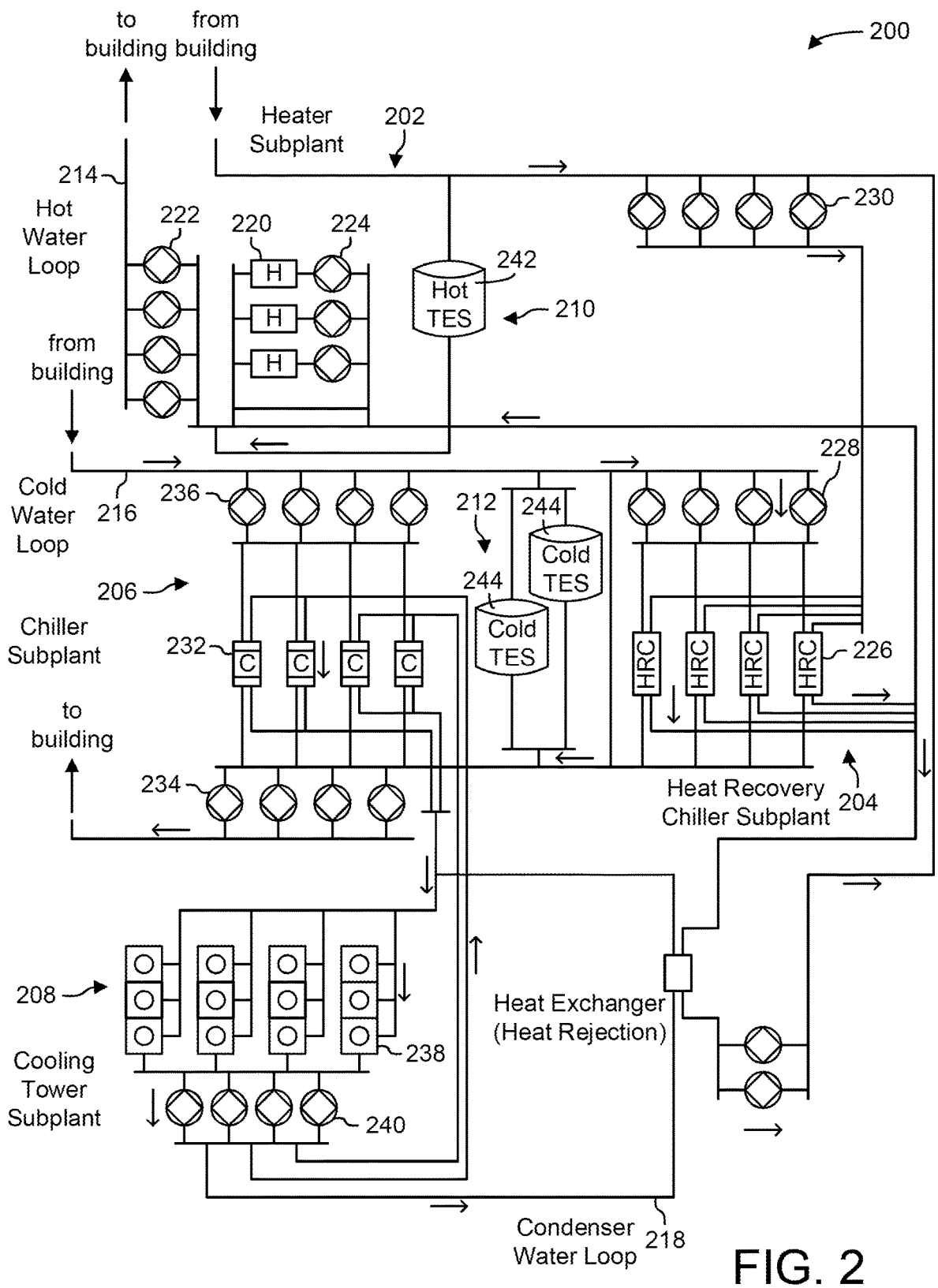
FIG. 2 is a block diagram of a waterside system that may be used in conjunction with the building illustrated in FIG. 1, according to an exemplary embodiment.
Figure 3:
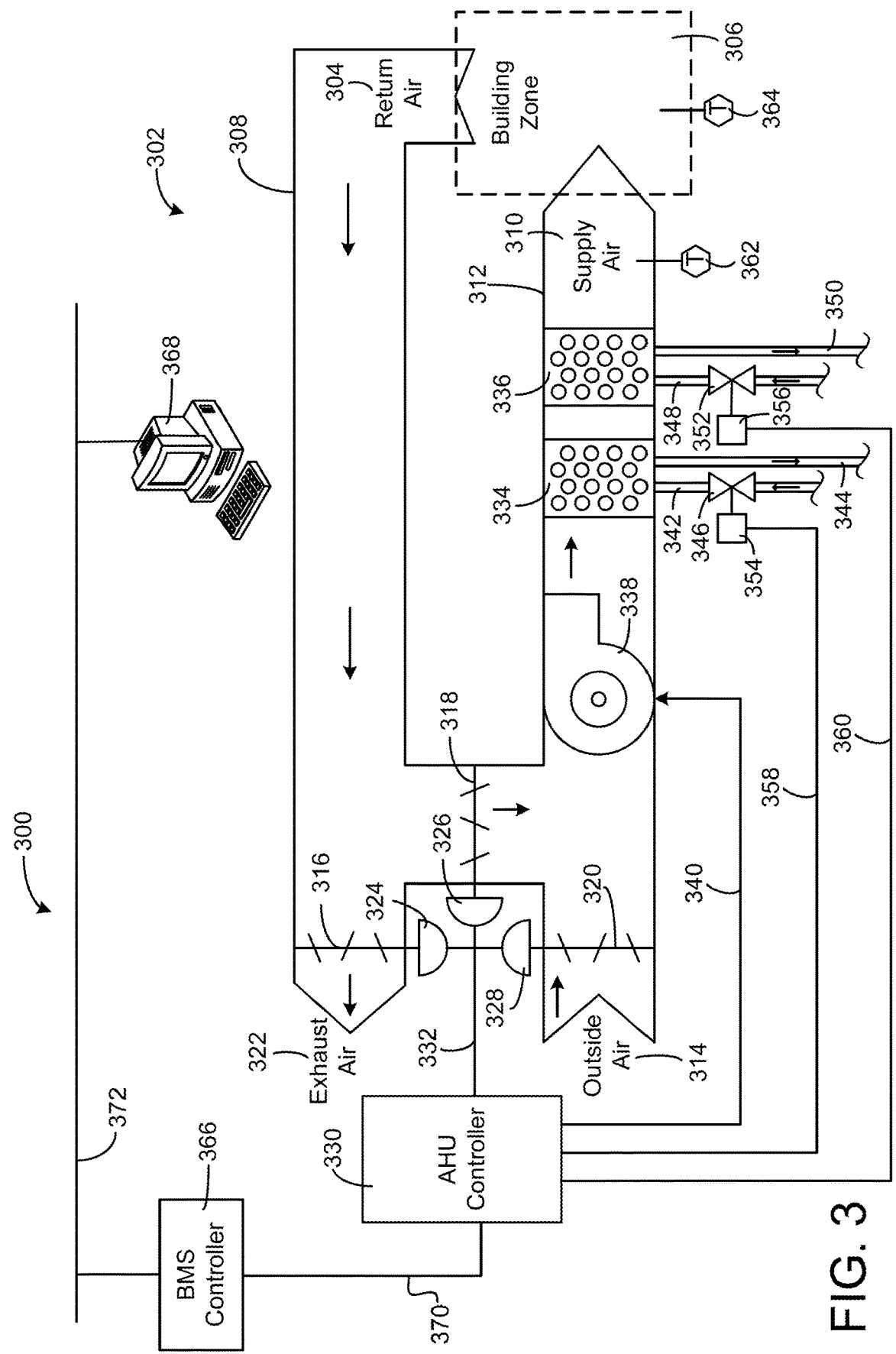
FIG. 3 is a block diagram of an airside system which can be used as part of the HVAC system illustrated in FIG. 1, according to an exemplary embodiment.
Figure 4:
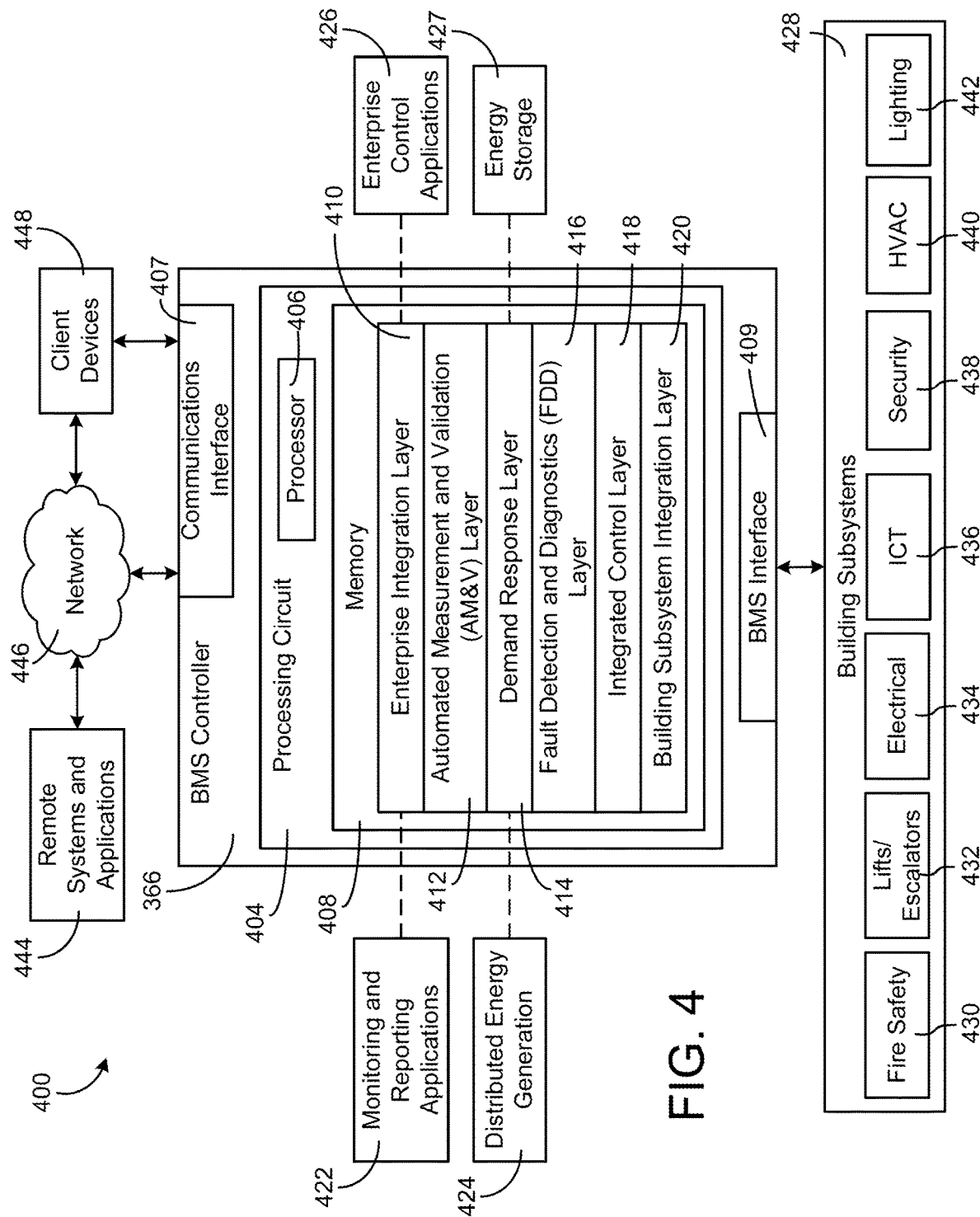
FIG. 4 is a block diagram of a BMS which can be used in the building illustrated in FIG. 1, according to an exemplary embodiment.
Figure 5:
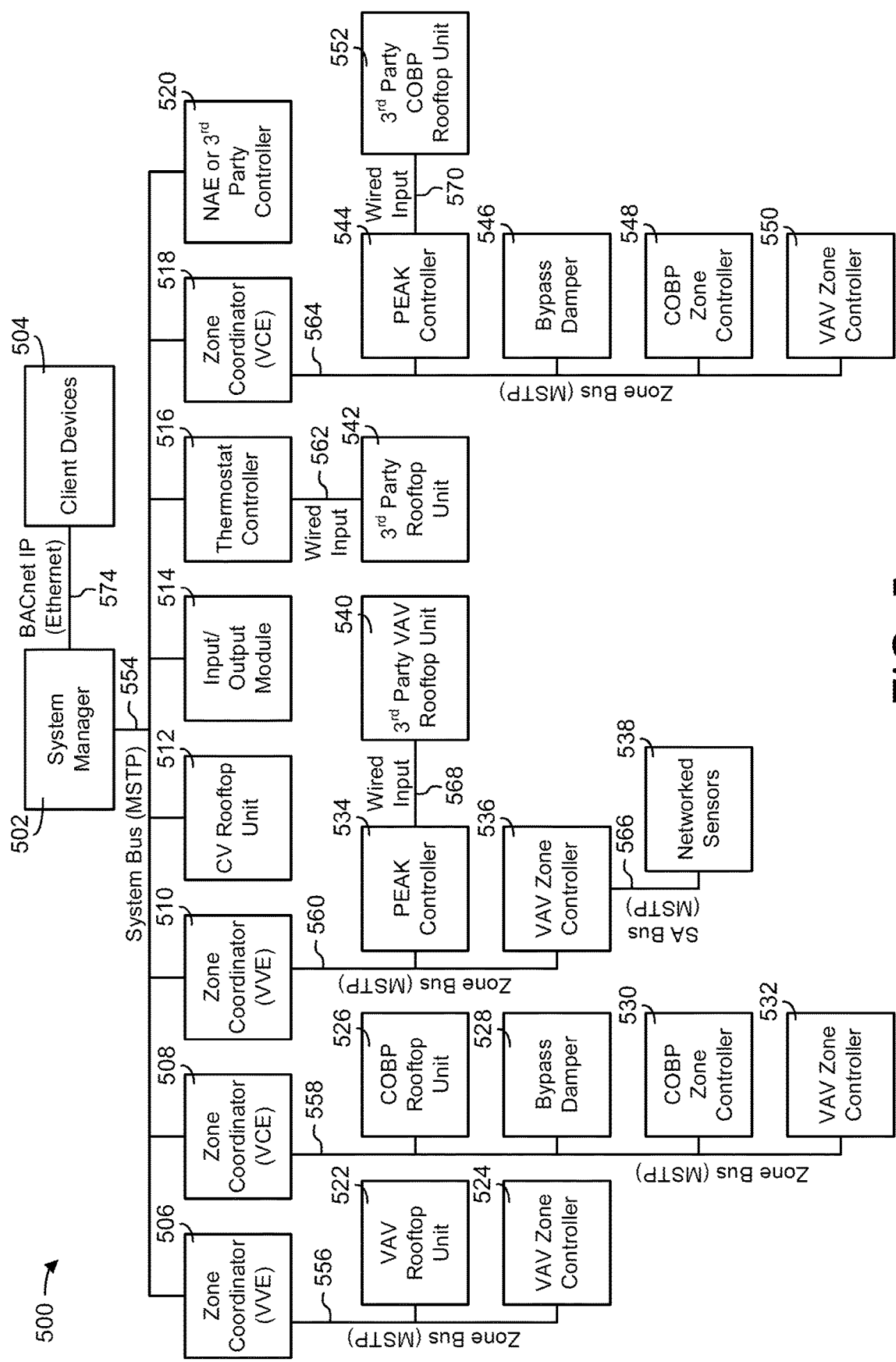
FIG. 5 is a block diagram of another BMS which can be used in the building illustrated in FIG. 1, according to an exemplary embodiment.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building and HVAC System

Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 and building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200(e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management Systems

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a system manager 502; several zone coordinators 506, 508, 510 and 518; and several zone controllers 524, 530, 532, 536, 548, and 550. System manager 502 can monitor data points in BMS 500 and report monitored variables to various monitoring and/or control applications. System manager 502 can communicate with client devices 504 (e.g., user devices, desktop computers, laptop computers, mobile devices, etc.) via a data communications link 574 (e.g., BACnet IP, Ethernet, wired or wireless communications, etc.). System manager 502 can provide a user interface to client devices 504 via data communications link 574. The user interface may allow users to monitor and/or control BMS 500 via client devices 504.

In some embodiments, system manager 502 is connected with zone coordinators 506-510 and 518 via a system bus 554. System manager 502 can be configured to communicate with zone coordinators 506-510 and 518 via system bus 554 using a master-slave token passing (MSTP) protocol or any other communications protocol. System bus 554 can also connect system manager 502 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 502 and can be connected directly to system bus 554. Other RTUs can communicate with system manager 502 via an intermediate device. For example, a wired input 562 can connect a third-party RTU 542 to thermostat controller 516, which connects to system bus 554.

System manager 502 can provide a user interface for any device containing an equipment model. Devices such as zone coordinators 506-510 and 518 and thermostat controller 516 can provide their equipment models to system manager 502 via system bus 554. In some embodiments, system manager 502 automatically creates equipment models for connected devices that do not contain an equipment model (e.g., IOM 514, third party controller 520, etc.). For example, system manager 502 can create an equipment model for any device that responds to a device tree request. The equipment models created by system manager 502 can be stored within system manager 502. System manager 502 can then provide a user interface for devices that do not contain their own equipment models using the equipment models created by system manager 502. In some embodiments, system manager 502 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Building Analysis Systems

Figure 6:
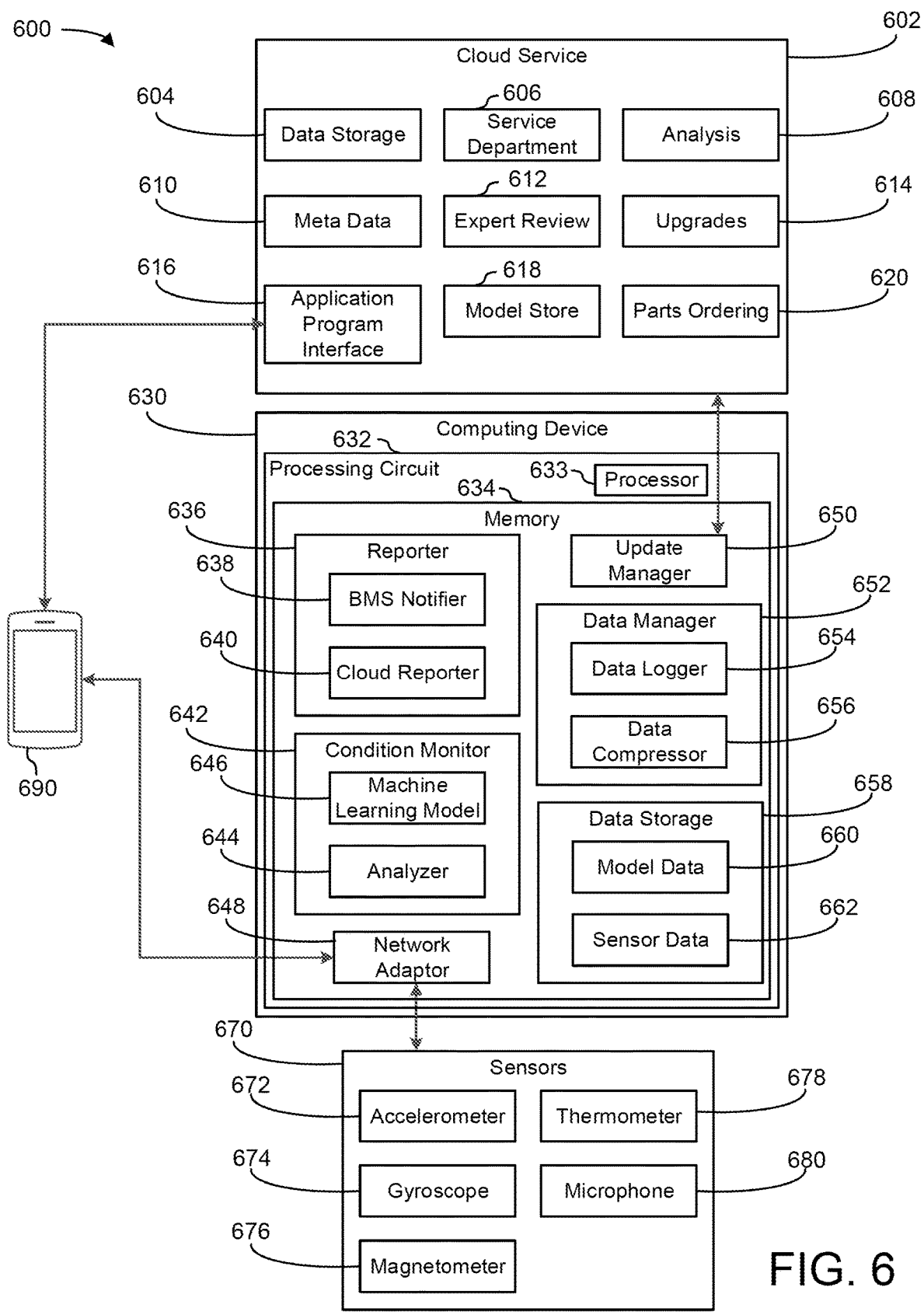
FIG. 6 is a block diagram of a system to predict the performance of a machine used in the building illustrated in FIG. 1, according to an exemplary embodiment.

Referring now to FIG. 6, a block diagram of a system 600 to predict the performance of equipment used in the building 10 illustrated in FIG. 1 is shown, according to an exemplary embodiment. The system 600 includes a cloud service 602, a computing device 630, sensors 670, and a mobile device 690. The cloud service 602 is a cloud server (e.g., a virtual server) that is located in a different geographic location than the building 10. The cloud service 602 is configured to provide tools for use in the analysis of equipment, and can be accessed remotely by various users across various building sites simultaneously. The cloud service 602 is shown to include a data storage portion 604, a service department 606, an analysis portion 608, a meta data portion 610, an expert review portion 612, an upgrades portion 614, an application program interface 616, a model store 618, and a parts ordering portion 620.

The data storage portion 604 is operable to store data sent from equipment being monitored by the computing device 630 located at the building 10. The data is stored in the data storage portion 604 for further analysis by the analysis portion 608. For example, the data storage portion 604 can store data related to the vibrational peaks of a chiller that are not typical vibrational peaks. The data storage portion 604 stores the data until the analysis portion 608 analyzes the data.

The service department 606 is operable to receive data from any of the components within the cloud service 602 and reference the data when scheduling site visits for maintenance procedures. For example, a chiller in the building 10 may provide data to the data storage portion 604 that indicates the chiller may be malfunctioning. The problem may require a site visit, and the service department 606 includes information regarding the operation of the chiller (e.g., atypical vibrational peaks) when scheduling the service such that the service technician can be prepared to address the problem at the time of the visit.

The analysis portion 608 is operable to receive information related to a piece of building equipment, analyze the information, and provide feedback regarding the status of the building equipment. The feedback is provided to customers via reports that compare the operation of the customer's building equipment to that of other, similar building equipment or to the same building equipment at different points in time. For example, the analysis portion 608 may receive data related to the chiller that exhibits atypical vibrational peaks. The analysis portion 608 can analyze the data, compare the operation of the chiller to other chillers, and provide a report to the customer regarding the operation of the chiller that exhibits atypical vibrational peaks.

The metadata portion 610 is operable to store data related to the identity of different pieces of building equipment. For example, the building 10 may include multiple chillers and boilers. The metadata portion 610 stores information related to the various chillers and boilers such that each piece of equipment can be identified. For example, the metadata portion 610 can store information including the type of equipment, the model and serial number, the physical location of the equipment within the building, previous maintenance reports, the model and serial numbers of the component parts of the equipment, and other information that would help to identify each piece of equipment.

The expert review portion 612 is operable to provide a human review of data related to a piece of equipment. For example, an automated analysis of a chiller that exhibits atypical vibrational peak may not provide sufficient feedback to address the potential issue. The expert review portion 612 forwards the relevant data to a human expert who reviews the data and provides feedback regarding the operation of the chiller.

The upgrade portion 614 is operable to synthesize data within the cloud service 602 and generate upgrades to remote monitoring software located at, for example, the building 10 such that the local monitoring system includes the most up-to-date information. For example, the cloud service 602 may receive multiple instances of chillers exhibiting atypical vibrational peaks. After further analysis, a determination is made as to the cause of, and solution to, the atypical vibrational peaks. The upgrade portion 614 generates an upgrade to the equipment monitoring software such that the local monitoring equipment is capable of diagnosing the atypical vibration issue without sending the data to the cloud service 602.

The application program interface ("API") portion 616 is communicably coupled to the mobile device 690 and is operable provide data to various applications that require access to the data. For example, a site manager may use an application located on the mobile device 690 that provides a user interface to manage the various equipment located at the building 10. The API 616 communicates with the application located on the mobile device 690 to provide the application the ability to use the data to generate reports, examine trends, and for any other purpose for which the equipment data would be useful. Furthermore, in instances where problems with building equipment cannot be detected automatically, the API 616 provides data to a human analyst for the analyst to view and determine the issue based on the data provided.

The model store 618 is operable to be a repository of various data analysis models that can be implemented on various types of equipment. The model store 618 can include different data analysis models, and different versions of the same data analysis models. For example, the model store 618 can include a data analysis model for a large chiller, a data analysis model for a small chiller, and models for component parts such as a drive, a shaft, a fan, and a compressor. The models can be stored according to a model number, wattage, or type of equipment, for example. Each data analysis model is developed specifically for the type of equipment with which it will be used. For example, a data analysis model could be developed for any type of equipment containing a roller element bearing, or a specific subset of chiller (e.g., a chiller with a centrifugal compressor or a screw compressor). In some embodiments, the data analysis model for the small chiller may include a base version and an enhanced version, where the base version provides minimal analysis features, and the enhanced version provides more analysis features than the base version. Whereas the data analysis model for the large chiller cannot be used with the small chiller, either the base version of the small chiller data analysis model or the enhanced version of the small chiller data analysis model can be used with the small chiller. In some embodiments, the data analysis model can be tuned based on the purpose of the model. For example, the data analysis model may be tuned to have zero false negatives (e.g., a fault will never be missed), however tuning a model in such a way can result in false positives (e.g., instances will be identified as faults when there is not a fault). The data analysis model can also include more balanced tuning, where the model may miss some faults, but will result in fewer false positives.

Either the site manager or the computing device 630 can visit the model store 618 online and determine which model is the preferred model for the equipment being used at the site. In some embodiments, multiple models can be used for a single piece of equipment. The models can be run in parallel (e.g., the models run concurrently) or in series as part of an escalation process. For example, a first data analysis model may find the data to be abnormal, triggering additional review by other analysis models or algorithms. If abnormalities are found by the other analysis models or algorithms, the data may be flagged for escalation to be analyzed by additional locally stored algorithms, algorithms stored on the cloud, or human review. On occasions where there is no internet connectivity or connectivity is otherwise blocked, the upgrade portion 614 can notify the site manager about the availability of new models. In some embodiments, the site manager periodically checks the model store 618 to determine if any new versions of data analysis models are available. In some embodiments, the computing device 630 periodically checks the model store 618 to determine if any new versions of data analysis models are available. In embodiments where the computing device 630 periodically checks the model store 618, the computing device 630 can automatically download the new versions of the data analysis models or prompt the site manager to choose whether to download the new versions.

In some embodiments, the model store 618 can provide suggestions to a site manager via the mobile device 690 regarding the preferred model for a particular piece of building equipment. For example, based on the available metadata regarding the equipment installed at a particular building site (e.g., the building 10), the available sensors, and the current model in use, the model store 618 can suggest the best model available. In addition, the model store 618 may determine that additional metadata related to the equipment is needed in order to provide the best model suggestion, and the model store 618 may prompt the site manager to enter additional metadata. The model store 618 may also determine if the site manager needs to install additional sensors on the equipment to take full advantage of the available models.

The parts ordering component 620 is operable to provide an online marketplace for a customer to order parts for the building equipment. For example, the site manager may be notified by the system 600 that a chiller will soon be in need of a replacement part. The site manager accesses the parts ordering component 620 to order the part, and is able to replace the part prior to the chiller failing.

The computing device 630 can be any type of device that can be instructed to carry out sequences of arithmetic or logical operations contained in a program. The computing device 630 is shown to include a processing circuit 632, which includes a processor 633 and a memory 634. The computing device 630 can be communicably coupled to both the cloud service 602 and the mobile device 690 such that the processing circuit 632 and the various components thereof can send and receive data. The processor 633 can be implemented as a general purpose processor, an application specific integrated circuit (ASIC), one or more field programmable gate arrays (FPGAs), a group of processing components, or other suitable electronic processing components.

The memory 634 (e.g., memory, memory unit, storage device, etc.) can include one or more devices (e.g., RAM, ROM, Flash memory, hard disk storage, etc.) for storing data and/or computer code for completing or facilitating the various processes, layers, and modules described in the present application. The memory 634 can be or include volatile memory or non-volatile memory. The memory 634 can include database components, object code components, script components, or any other type of information structure for supporting the various activities and information structures described in the present application. According to some embodiments, the memory 634 is communicably coupled to the processor 633 via the processing circuit 632 and includes computer code for executing (e.g., by the processing circuit 632 or the processor 633) one or more processes described herein.

The memory 634 is shown to include a reporter 636, a condition monitor 642, a network adaptor 648, an update manager 650, a data manager 652, and a data storage portion 658. The reporter 636 is operable to send notifications in the case of a fault or alarm and includes a BMS notifier 638 and a cloud reporter 640. The BMS notifier 638 is operable to notify the BMS 400 in the event of a fault or alarm. For example, if a chiller alarm is sounded, the BMS notifier 638 will communicate with the BMS 400 to notify the BMS 400 that the chiller alarm is sounding. The BMS notifier 638 can communicate with the BMS 400 via email, text, phone call, or any other type of communication operable to notify the BMS 400 of the issue. The cloud reporter 640 is operable to notify the cloud service 602 of the chiller alarm. The cloud reporter 640 can communicate with the cloud service 602 via any means suitable to send the relevant information to the cloud service 602. The BMS notifier 638 is also operable to generate notifications of the health of equipment before an alarm sounds. For example, the BMS notifier 638 can generate a health index based on feedback from machine learning models, which indicate potential faults and failures of the equipment. The BMS notifier 638 provides the health index to the BMS 400 as described, and the cloud reporter 640 notifies the cloud service 602 of the health index.

The condition monitor 642 is operable to monitor the operation of the equipment connected to the computing device 630 and includes an analyzer 644 and a machine learning model 646. The analyzer 644 is operable to analyze data received from the sensors 670 and perform operations on the data to prepare the data for processing via the machine learning model 646. For example, the analyzer 644 receives vibration data from a chiller and performs a Fast Fourier Transform on the data such that the data is transformed from time domain data to frequency domain data and the vibrational peaks can be evaluated by the machine learning model 646.

The machine learning model 646 is operable to evaluate the data provided by the analyzer 644 and determine if the equipment generating the data is operating normally or is in need of maintenance. In some embodiments, the machine learning model 646 is capable of making a determination regarding the data based on the information available in the model. For example, the machine learning model 646 can receive vibration data related to a chiller from the analyzer 644. After running the vibration data through the model, the machine learning model 646 may determine that the received vibration data matches other data available in the model, and the match indicates that the chiller is in need of maintenance. As another example, the machine learning model 646 may determine that the vibration data does not match other data available in the model, but the vibration data indicates that the chiller is not operating normally (e.g., the vibration data does not match the "normal" data in the machine learning model 646).

In some embodiments, the machine learning model 646 is not capable of making a determination regarding the data based on the information available in the model. For example, the machine learning model 646 can receive vibration data from the analyzer 644, and the vibration data may not match any other data available in the model. In such embodiments, the machine learning model 646 can communicate with the cloud service 602 and provide the data to the data storage portion 604. If the cloud service 602 can provide additional information via the model store 618 or the upgrade portion 614, the additional information can be provided to the machine learning model 646 via a new model or an upgrade to the current model. If the cloud service 602 cannot provide additional information, the data may be sent to the expert review portion 612 or the analysis portion 608 for additional analysis.

In some embodiments, the machine learning model 646 is capable of learning on its own by comparing incoming data to data already within the model. The machine learning model 646 can include one or more algorithms (e.g., supervised learning, unsupervised learning, reinforcement learning, etc.) to learn. In some embodiments, the machine learning model 646 can include one or more learning processes or techniques (e.g., feature learning, sparse dictionary learning, anomaly detection, decision trees, association rules, etc.) within the learning algorithms. In some embodiments, the machine learning model 646 can include one or more models (e.g., artificial neural networks, support vector networks, Bayesian networks, genetic algorithms, etc.) from which to learn. Any of the learning algorithms, learning processes and/or techniques, or learning models can be used to train the machine learning model 646 to make more accurate determinations based on the available data.

In some embodiments, the machine learning model 646 is not capable of learning on its own, and can only make determinations based on the data available in the model. In such embodiments, in order to incorporate new learnings into the machine learning model 646, the machine learning model 646 must be updated via the upgrade portion 614 of the cloud service 602, or the machine learning model 646 must be replaced with a new machine learning model 646 via the model store 618 of the cloud service 602.

The network adaptor 648 is configured to conduct data communications with the sensors 270 and the mobile device 690. In various embodiments, communications via the network adaptor 648 can be direct (e.g., local wired or wireless communications) or via a communications network (e.g., a WAN, the Internet, a cellular network, etc.). For example, the network adaptor 648 can include an Ethernet card and port for sending and receiving data via an Ethernet-based communications link or network. In another example, the network adaptor 648 can include a Wi-Fi transceiver for communicating via a wireless communications network. In another example, the network adaptor 648 can include cellular or mobile phone communications transceivers. In another example, the network adaptor 648 can include a Bluetooth communications network.

The update manager 650 is communicably coupled to the cloud service 602 either directly or via the mobile device 690, and is configured to manage the updates provided to the machine learning model 646. In embodiments where the update manager 650 is in direct communication with the cloud service 602, the update manager 650 receives suggestions from the model store 618 and the upgrade portion 614 regarding the machine learning model 646. The update manager 650 determines when to update the machine learning model 646 and when to apply upgrades to the machine learning model 646, and can do so automatically without the intervention of the site manager.

In embodiments where the update manager 650 is in contact with the cloud service via the mobile device 690, the model store 618 and the upgrade portion 614 communicate to the site manager via the mobile device 690 regarding the available upgrades and new learning models based on the available metadata, the sensors installed on the equipment, and the learning models currently in use. The site manager then decides which upgrades and/or new models to install and authorizes the updated manager 650 to proceed with the installation.

The data manager 652 is operable to limit the amount of data available in the computing device 630 to a manageable level, and includes a data logger 654 and a data compressor 656. The data logger 654 is operable to save atypical data for further analysis and to discard normal data. For example, a chiller may operate normally (e.g., without any abnormal data) for a long period of time. The data logger 654 will delete the data associated with the normal operation because the data is not required for further analysis. However, when the chiller begins to operate abnormally, the data logger 654 saves the data associated with the abnormal operation for further analysis. By operating in this way, the computing device 630 remains small and portable, and can even run on a battery instead of plugging in to a power source. The data logger 654 can also implement a retention policy such that data that is on the data logger 654 for longer than a specific period of time (for example, one year) is deleted.

The data compressor 656 is operable to receive the raw data from the sensors 670 and compress the data to decrease the overall file size of the data. Data compression is required in order for the computing device 630 to remain small and portable. The data compressor 656 provides the compressed data to the data logger 654.

The data storage portion 658 is operable to store data required by other components within the computing device 630 and includes model data 660 and sensor data 662. The model data 660 is the data to which the machine learning model 646 compares the data received from the sensors 670 in order to determine the operation of the building equipment. For example, the model data 660 may include normal operating data for a chiller, and it may also include data for common problems experienced by similar chillers, and the causes of those problems. When the machine learning model 646 compares the data received from the sensors 670 to the model data 660, the machine learning model 646 can determine, based on the comparison of the data received to the model data 660, if the chiller is operating normally or abnormally. If the chiller is operating abnormally and the data received from the sensors 670 matches data available in the model data 660, the machine learning model 646 can provide the likely reason for the abnormal operation.

The sensor data 662 is the raw data from the sensors 670, and the sensor data 662 is stored as it is received from the sensors. The sensor data 662 is communicably coupled to the data logger 654, and the data logger 654 determines which data from the sensor data 662 should be kept for future reference or analysis.

The sensors 670 are communicably coupled to the network adaptor 648 and are operable to detect and record data related to the operation of building equipment and can include an accelerometer 672, a gyroscope 674, a magnetometer 676, a thermometer 678, a microphone 680, and any other type of sensor that can provide data regarding the operation of building equipment. The accelerometer 672 and the gyroscope 674 are operable to detect and measure vibrations of building equipment. For example, the accelerometer 672 and the gyroscope 674 can detect and measure the vibrations of a chiller, and provide the vibration data to the computing device 630 for further analysis.

The magnetometer 676 is operable to detect and measure the magnetic field of building equipment. For example, the magnetometer 676 can detect and measure the magnetic field surrounding specific areas of a chiller during operation, and provide the magnetic field data to the computing device 630 for further analysis.

The thermometer 678 is operable to detect and measure the temperature of building equipment. For example, the thermometer 678 can detect and measure the temperature of a chiller during operation, and provide the temperature data to the computing device 630 for further analysis.

The microphone 680 is operable to detect and measure sound waves generated by building equipment. For example, the microphone 680 can detect and measure the sound waves generated by a chiller during operation, and provide the sound wave data to the computing device 630 for further analysis.

In some embodiments, the sensors 670 includes a plurality of individual sensors, where each sensor is communicably coupled to the network adaptor 648. In some embodiments, the sensors 670 includes a single chip module to which a number of sensors are affixed. The sensors 670 can communicate with the network adaptor 648 via any known communication means including, but not limited to, Bluetooth, Wi-Fi, wired connections, and cellular connections.

In some embodiments, the computing device 630 is located within a building equipment area in which many pieces of building equipment are located. Each piece of building equipment may include multiple sensors 670 that communicate with the network adaptor 648 via Bluetooth to provide the sensor data 662 to the computing device 630.

In some embodiments, the sensors 670 can be moved between pieces of building equipment. For example, the sensors 670 may be removably coupled to a first chiller for a certain period of time, and then the sensors 670 may be removed from the first chiller and removably coupled to a second chiller. In this example, the sensors 670 will continue to detect data, but will not notify the site manager from which chiller the data was generated. Therefore, the site manager must document the chiller for which the sensors 670 are detecting data to prevent errors in maintenance or repair.

As another example, the sensors 670 can be electronically coupled to a specific piece of building equipment. The electronic coupling can be accomplished via a Bluetooth connection, or any other type of connection that can electronically couple a sensor to a piece of equipment. For example, the sensors 670 may be coupled to a first chiller and detect data related to the first chiller. If the sensors 670 were removed from the first chiller and coupled to a second chiller, the sensors 670 can send a message to the site manager or the cloud service 602 as a notification that the sensors 670 are no longer detecting data from the first chiller.

In some embodiments, the sensors 670 are capable of conserving battery life by operating in a mode in which the sensors 670 monitor the physical characteristics of the building equipment, but do not record data or communicate data unless the physical characteristics indicate abnormal operation. For example, the sensors 670 can monitor the vibrations of a chiller continuously, however the sensors 670 will not transmit normal operating data of the chiller to the sensor data portion 662 unless the sensors 670 detect abnormal vibrational data. When abnormal data is detected, the sensors 670 record the data and provide the data to the sensor data portion 662. Operating in this manner, the sensors 670 can conserve power and operate for long periods of time without requiring batteries to be replaced or recharged.

Figure 7:
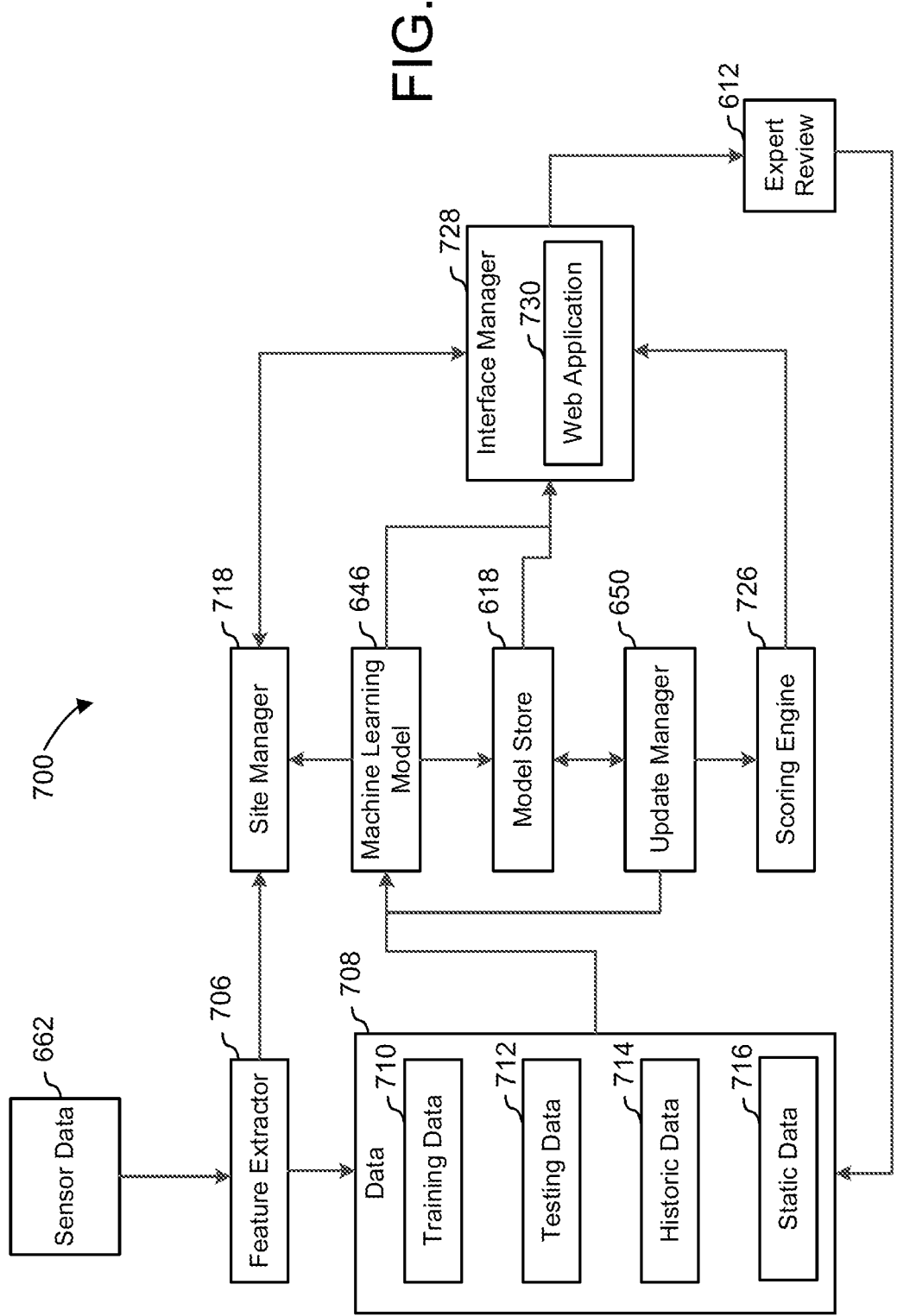
FIG. 7 is a block diagram of a feedback loop to predict the performance of a machine used in the building illustrated in FIG. 1, according to an exemplary embodiment.

Referring to FIG. 7, a block diagram of a feedback loop 700 to predict the performance of a machine used in the building 10 is shown, according to an exemplary embodiment. The feedback loop 700 can be implemented to enhance the learning capabilities of the machine learning model 646 over time such that the machine learning model 646 becomes more accurate in its determinations over time. The feedback loop 700 is shown to include the sensor data 662, a feature extractor 706, data 708, a site manager 718, the machine learning model 646, the model store 618, the update manager 650, a scoring engine 726, an interface manager 728, and the expert review 612.

The sensor data 662 is generated as the sensors 670 detect and measure data related to the operation of building equipment. The sensor data 662 can be generated as time-domain data that requires further manipulation for a full analysis.

The feature extractor 706 is communicably coupled to the data 708 and the site manager 718 and is configured to receive the sensor data 662 and extract the spectral data features for further analysis, in some embodiments. In some embodiments, the feature extractor 706 manipulates the sensor data 662 such that the data features are in condition to be analyzed. For example, the feature extractor 706 is configured to manipulate the sensor data 662 using techniques such as a discrete Fourier transform or a fast Fourier transform, in some embodiments.

The data 708 is configured to receive the extracted features from the feature extractor 706 and include the extracted features with training data 710, testing data 712, historic data 714, and static data 716. The data 708 can be included in the data storage portion 658, the data manager portion 652, or in a separate location (e.g., the model data 660). The training data 710 includes data used to train the machine learning model 646. For example, the training data 710 can include fabricated data (e.g., data generated by a computer instead of by a functioning machine) for the sole purpose of training the machine learning model 646. In some embodiments, the training data 710 can include data for rare or special cases of equipment operation or malfunction such that the machine learning model 646 can recognize such cases when they occur.

The testing data 712 includes data generated when testing the building equipment. For example, testing the building equipment may require the equipment to operate outside the typical operational constraints, thereby generating data that would otherwise seem anomalous. Including the testing data 712 within the data 708 provides the machine learning model 646 the ability to determine whether the equipment is being tested, thereby avoiding false alarms.

The historic data 714 includes data generated by the building equipment over time. The historic data can include normal operating data and abnormal data. For example, the historic data 714 for a chiller can include normal operating data such that the machine learning model 646 can recognize normal operation of the chiller. The historic data 714 for a chiller can also include abnormal operation data such that the machine learning model 646 can recognize abnormal operation of the chiller.

The static data 716 includes constant data related to a piece of building equipment. For example, static data 716 related to a chiller can include the chiller model number, serial number, the model and serial numbers of the individual components within the chiller, the maintenance records, and any other type of data that remains substantially unchanged over time.

The site manager 718 is communicably coupled to the feature extractor 706, the machine learning model 646, and the interface manager 728 and is configured to manage the feedback loop 700. For example, in some embodiments it may be desirable to operate the feedback loop 700 continuously such that the machine learning model 646 is constantly monitoring the building equipment and is constantly building its learning capabilities. In such embodiments, the site manager 718 can set the feedback loop 700 to be in continuous operation. However, in some embodiments it may be desirable to operate the feedback loop 700 on a discontinuous basis. For example, energy conservation may be very important, and continuously operating the feedback loop 700 may consume more energy than is desirable. In such embodiments, the site manager 718 can determine a schedule to be followed by the feedback loop 700 such that the feedback loop 700 operates at discrete times.

The scoring engine 726 is operable to generate new predictions in response to the training data 710. In some embodiments, the scoring engine 726 is integrated into the machine learning model 646. In some embodiments, the scoring engine 726 is a standalone component of the feedback loop 700. The scoring engine 726 receives training data 710 and runs the data through the machine learning model 646, and generates a prediction based on the training data 710 and the model. For example, the training data 710 may include anomalous chiller data that is not included in the machine learning model (e.g., the training data 710 indicates a chiller failure mode not available in the machine learning model 646). The scoring engine 726 makes a prediction of the performance of the chiller using the training data 710 and the machine learning model 646. The prediction is sent to the interface manager 728 for further analysis.

The interface manager 728 is communicably coupled to the site manager 718, the model store 618, and the scoring engine 726, and is operable to provide machine learning data to the expert review 612 for additional analysis. The interface manager 728 can provide data to the expert review 612 in a variety of ways depending on how the data is viewed. For instance, the expert review 612 may occur on a mobile device (e.g., the mobile device 690), and the interface manager 728 formats the data such that the data can be viewed properly on the mobile device 690. As another example, the expert review 612 may occur on a laptop computer, and the interface manager 728 formats the data such that the data can be viewed properly on the laptop computer.

The interface manager 728 further includes a web application 730. The web application 730 can be any type of computer program that can be run in a web browser on an electronic device (e.g., a mobile device, a laptop computer, a tablet computer, etc.). The web application 730 is operable to receive data from the scoring engine 726 and incorporate the data into the web application 730 such that a site manager can access the information via the interface manager 728.

Figure 8:
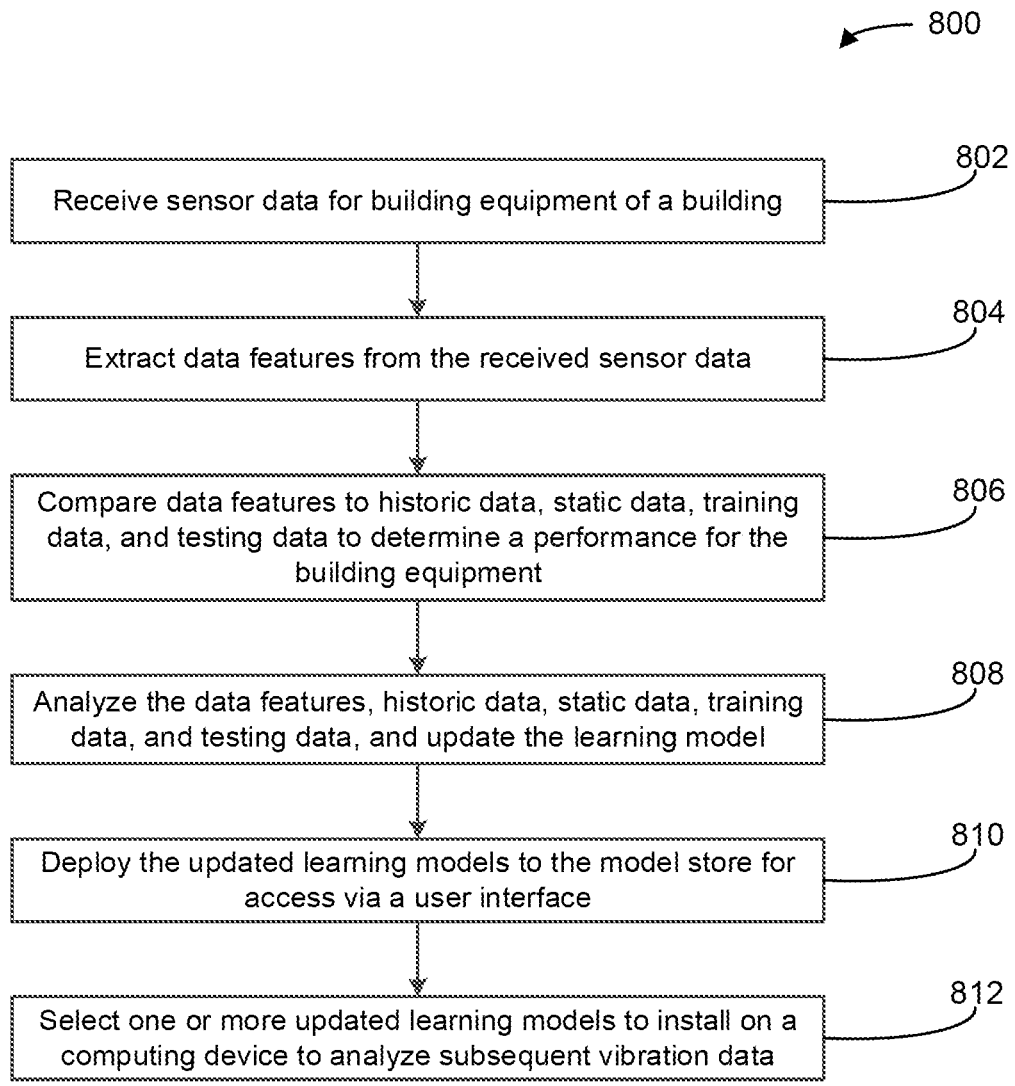
FIG. 8 is a flow diagram of a process to predict the performance of a machine used in the building illustrated in FIG. 1, according to an exemplary embodiment.

Referring now to FIG. 8, a flow diagram of a process 800 to predict the performance of a machine used in the building 10 is shown, according to an exemplary embodiment. The system 600 and/or the feedback loop 700 can be configured to perform the process 800. Furthermore, any other computing device described herein (for example, the building equipment itself), can be configured to perform the process 800.

In step 802, data for building equipment of a building is received. Building equipment (e.g., a chiller from a HVAC system) may be operating. During operation, the building equipment can produce vibrations, noises, temperatures, and other physical characteristics indicative of its performance.

The physical characteristics can be captured by the sensors 670 to create the sensor data 662. The sensor data 662 can include data that indicates whether the building equipment is operating normally or abnormally and may be in need of maintenance.

In step 804, data features are extracted from the sensor data 662. The feature extractor 706 receives the data from the sensors 670 and manipulates the sensor data 662 using a mathematical method like a discrete Fourier transform or a fast Fourier transform to extract certain features of the sensor data 662 to put the sensor data 662 in condition for further analysis by the machine learning model 646.

In step 806, the features of the sensor data 662 are compared to the data 708 to determine the performance of the building equipment. The machine learning model 646 receives the sensor data 662 from the feature extractor 706 and the training data 710, the testing data 712, the historic data 714, and the static data 716 from the data portion 708. The machine learning model 646 compares all of the data received with other available data (e.g., from the model data 660) to make a determination regarding the performance of the building equipment. The machine learning model 646 can provide the determination to the expert review portion 612 via the interface manager 728 and/or the mobile device 690 for additional review and/or analysis, as needed. Furthermore, the machine learning model 646 can provide the determination to the model store 618 via the mobile device 690 such that additional models can be evaluated.

In step 808, analysis is performed on the data and updated learning models are deployed. The expert review portion 612 can provide the necessary data, along with the determination made by the machine learning model 646, to a human expert to review the data and the determination of the machine learning model 646. In some embodiments, the human expert can determine that the machine learning model 646 was incorrect in its determination. In such embodiments, the human expert can update the data portion 708 to include the correct determination when the machine learning model 646 is presented with similar data in the future, effectively updating the machine learning model 646. Additionally, the model store 618 makes a determination as to whether a new model (or an upgrade via the upgrade portion 614) includes the updated determinations. For example, a new model may have been developed in response to multiple instances of similar erroneous determinations from other sites. If the model store 618 determines that a new model or an upgrade is available that can provide for more accurate results in the future, the update manager 650 is notified.

In step 810, a new or updated machine learning model is deployed to the model store 618. For example, similar erroneous failures may occur across multiple sites, prompting the analysis portion 608 to determine the problem and provide an upgrade to the machine learning model 646 or to create a new model to incorporate the correct response to the data. If an upgrade is completed, the upgrade is included as part of the upgrade portion 614. If a new model is created, the new model is included in the model store 618.

In step 812, one or more updated learning models is selected for installation on the computing device 630. If the model store 618 determines that a new model or an upgrade is available, the model store 618 provides the information to the interface manager 728 and the update manager 650. The interface manager 728 can provide the information regarding the updated model to the site manager 718 via the mobile device 690, and the site manager 718 can make a determination as to whether the machine learning model 646 needs to be updated. In another embodiment, more than one updated or upgraded model(s) are available to implement, and the site manager 718 is provided with the various options from which to choose which model to implement. In another embodiment, the update manager 650 automatically updates or replaces the machine learning model 646 with an upgrade or a new model without the input of the site manager 718.

After the new model or upgraded model is installed on the computing device 630, the new or upgraded model is used for subsequent data analysis, and the feedback loop 700 is repeated to further increase the accuracy of the machine learning model 646.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted.

Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for predicting performance of building equipment, the system comprising one or more processors and memory storing instructions that, when executed by the one or more processors, cause the one or more processors to perform operations comprising:
   obtaining sensor data generated by one or more sensors while operating the building equipment to affect one or more environmental conditions of a building;
   determining that a machine learning model is either capable or not capable of generating a predicted performance of the building equipment based on the sensor data and prior data available in the model;
   generating the predicted performance of the building equipment using the machine learning model in response to determining that the machine learning model is capable of generating the predicted performance based on the sensor data and prior data available in the model;
   requesting feedback from an expert related to the predicted performance of the building equipment in response to determining that the machine learning model is not capable of generating the predicted performance based on the sensor data and the prior data available in the model;
   determining that the building equipment is in need of maintenance based on at least one of the predicted performance of the building equipment generated using the machine learning model or the feedback from the expert related to the predicted performance of the building equipment; and
   automatically initiating a maintenance activity for the building equipment in response to determining that the building equipment is in need of maintenance.

2. The system of claim 1, wherein the sensor data are generated during a first time period while operating the building equipment to affect the one or more environmental conditions of the building and obtained by the system during or after the first time period.

3. The system of claim 1, wherein the one or more processors and the memory are components of a computing device located in a same geographic location as the one or more sensors;
   wherein requesting the feedback from the expert comprises sending a feedback request from the computing device to a cloud service located in a different geographic location than the computing device.

4. The system of claim 1, the operations further comprising, if the sensor data are different from the prior data:
   generating an updated machine learning model using the feedback from the expert; and
   using the updated machine learning model to generate the predicted performance of the equipment.

5. The system of claim 1, wherein the one or more sensors comprise at least one of an accelerometer, a magnetometer, a gyroscope, a thermometer, or a microphone.

6. The system of claim 1, wherein the sensor data comprise vibration data;
   the operations further comprising transforming the vibration data from a time domain to a frequency domain and providing the vibration data in the frequency domain as input to the machine learning model.

7. The system of claim 1, the operations further comprising:
   evaluating the sensor data to determine whether the building equipment is operating abnormally; and
   transmitting the sensor data from in response to determining that the building equipment is operating abnormally.

8. A method for predicting performance of building equipment, the method comprising:
   obtaining sensor data generated by one or more sensors while operating the building equipment to affect one or more environmental conditions of a building;
   determining that a machine learning model is either capable or not capable of generating a predicted performance of the building equipment based on the sensor data and prior data available in the model;
   generating the predicted performance of the building equipment using the machine learning model in response to determining that the machine learning model is capable of generating the predicted performance based on the sensor data and prior data available in the model;
   requesting feedback from an expert related to the predicted performance of the building equipment in response to determining that the machine learning model is not capable of generating the predicted performance based on the sensor data and the prior data available in the model;
   determining that the building equipment is in need of maintenance based on at least one of the predicted performance of the building equipment generated using the machine learning model or the feedback from the expert related to the predicted performance of the building equipment; and
   automatically initiating a maintenance activity for the building equipment in response to determining that the building equipment is in need of maintenance.

9. The method of claim 8, wherein the sensor data are generated during a first time period while operating the building equipment to affect the one or more environmental conditions of the building and obtained by the system during or after the first time period.

10. The method of claim 8, wherein requesting the feedback from the expert comprises sending a feedback request from a computing device located in a same geographic location as the one or more sensors to a cloud service located in a different geographic location than the computing device.

11. The method of claim 8, further comprising, if the sensor data are different from the prior data:
    generating an updated machine learning model using the feedback from the expert; and
    using the updated machine learning model to generate the predicted performance of the equipment.

12. The method of claim 8, wherein the one or more sensors comprise at least one of an accelerometer, a magnetometer, a gyroscope, a thermometer, or a microphone.

13. The method of claim 8, wherein the sensor data comprise vibration data;
    the method further comprising transforming the vibration data from a time domain to a frequency domain and providing the vibration data in the frequency domain as input to the machine learning model.

14. The method of claim 8, further comprising:
evaluating the sensor data to determine whether the building equipment is operating abnormally; and
transmitting the sensor data from in response to determining that the building equipment is operating abnormally.

15. One or more non-transitory computer-readable storage media storing instructions that, when executed by one or more processors, cause the one or more processors to perform operations comprising:
obtaining sensor data generated by one or more sensors while operating the building equipment to affect one or more environmental conditions of a building;
determining that a machine learning model is either capable or not capable of generating a predicted performance of the building equipment based on the sensor data and prior data available in the model;
generating the predicted performance of the building equipment using the machine learning model in response to determining that the machine learning model is capable of generating the predicted performance based on the sensor data and prior data available in the model;
requesting feedback from an expert related to the predicted performance of the building equipment in response to determining that the machine learning model is not capable of generating the predicted performance based on the sensor data and the prior data available in the model;
determining that the building equipment is in need of maintenance based on at least one of the predicted performance of the building equipment generated using the machine learning model or the feedback from the expert related to the predicted performance of the building equipment; and
automatically initiating a maintenance activity for the building equipment in response to determining that the building equipment is in need of maintenance.

16. The non-transitory computer-readable storage media of claim 15, wherein the sensor data are generated during a first time period while operating the building equipment to affect the one or more environmental conditions of the building and obtained by the system during or after the first time period.

17. The non-transitory computer-readable storage media of claim 15, the operations further comprising, if the sensor data are different from the prior data:
generating an updated machine learning model using the feedback from the expert; and
using the updated machine learning model to generate the predicted performance of the equipment.

* * * * *